(12) United States Patent
Sakamoto et al.

(10) Patent No.: US 8,488,622 B2
(45) Date of Patent: Jul. 16, 2013

(54) JITTER CONTROL APPARATUS

(75) Inventors: Yuichiro Sakamoto, Kawasaki (JP); Hisayuki Ojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 313 days.

(21) Appl. No.: 12/629,413

(22) Filed: Dec. 2, 2009

(65) Prior Publication Data

US 2010/0074386 A1    Mar. 25, 2010

Related U.S. Application Data

(63) Continuation of application No. PCT/JP2007/000618, filed on Jun. 8, 2007.

(51) Int. Cl.
*H04J 15/00* (2006.01)

(52) U.S. Cl.
USPC .......................................................... 370/464

(58) Field of Classification Search
USPC ......... 370/464, 465, 498, 503–516, 535–542, 370/907
See application file for complete search history.

(56) References Cited

U.S. PATENT DOCUMENTS

| | | | | |
|---|---|---|---|---|
| 4,397,017 A | * | 8/1983 | Rokugo | 370/506 |
| 5,357,514 A | * | 10/1994 | Yoshida | 370/506 |
| 5,459,782 A | * | 10/1995 | Volejnik | 375/372 |
| 5,471,511 A | * | 11/1995 | De Langhe et al. | 375/376 |
| 7,023,942 B1 | * | 4/2006 | Roberts et al. | 375/356 |
| 7,042,908 B1 | * | 5/2006 | Mayer | 370/503 |
| 7,369,578 B2 | * | 5/2008 | Roberts et al. | 370/506 |
| 7,830,924 B2 | * | 11/2010 | Kawamura et al. | 370/505 |
| 2003/0123493 A1 | * | 7/2003 | Takahashi | 370/539 |
| 2005/0286521 A1 | * | 12/2005 | Chiang et al. | 370/389 |
| 2007/0019687 A1 | * | 1/2007 | Ruthstein et al. | 370/537 |
| 2007/0116061 A1 | * | 5/2007 | Meagher et al. | 370/503 |

FOREIGN PATENT DOCUMENTS

| | | |
|---|---|---|
| EP | 0 500 243 | 8/1992 |
| JP | 1-180142 | 7/1989 |
| JP | 3-38931 | 2/1991 |
| JP | 5-130064 | 5/1993 |
| JP | 6-85778 | 3/1994 |
| JP | 2004-282632 | 10/2004 |

OTHER PUBLICATIONS

ITU-T, G.8251, Control of jitter and wander within OTN, ITU-T, Nov. 2001, pp. 1-64.*
Yoshinori Rokugo et al., "Jitter Reduction for Asynchronous Network Application of Synchronous Digital Hierarchy," Journal of the Institute of Electronics, Information and Communication Engineers, B-I vol. J75-B-I No. 10, pp. 667-674, Oct. 1992.
International Search Report for PCT/JP2007/000618, mailed Jul. 17, 2007.

* cited by examiner

Primary Examiner — Dmitry H Levitan
(74) Attorney, Agent, or Firm — Fujitsu Patent Center

(57) ABSTRACT

A jitter control apparatus used in a multiplexing apparatus multiplexing a plurality of signals by asynchronous mapping, includes: a detection unit configured to detect a frequency of timing compensation processes in the asynchronous mapping for each of the plurality of signals; and a selection unit configured to select, on basis of a detection result by the detection unit, a clock signal to be used as a carrier clock for the plurality of signals, from a plurality of clock signals including clock signals extracted from at least one of the plurality of signals.

9 Claims, 14 Drawing Sheets

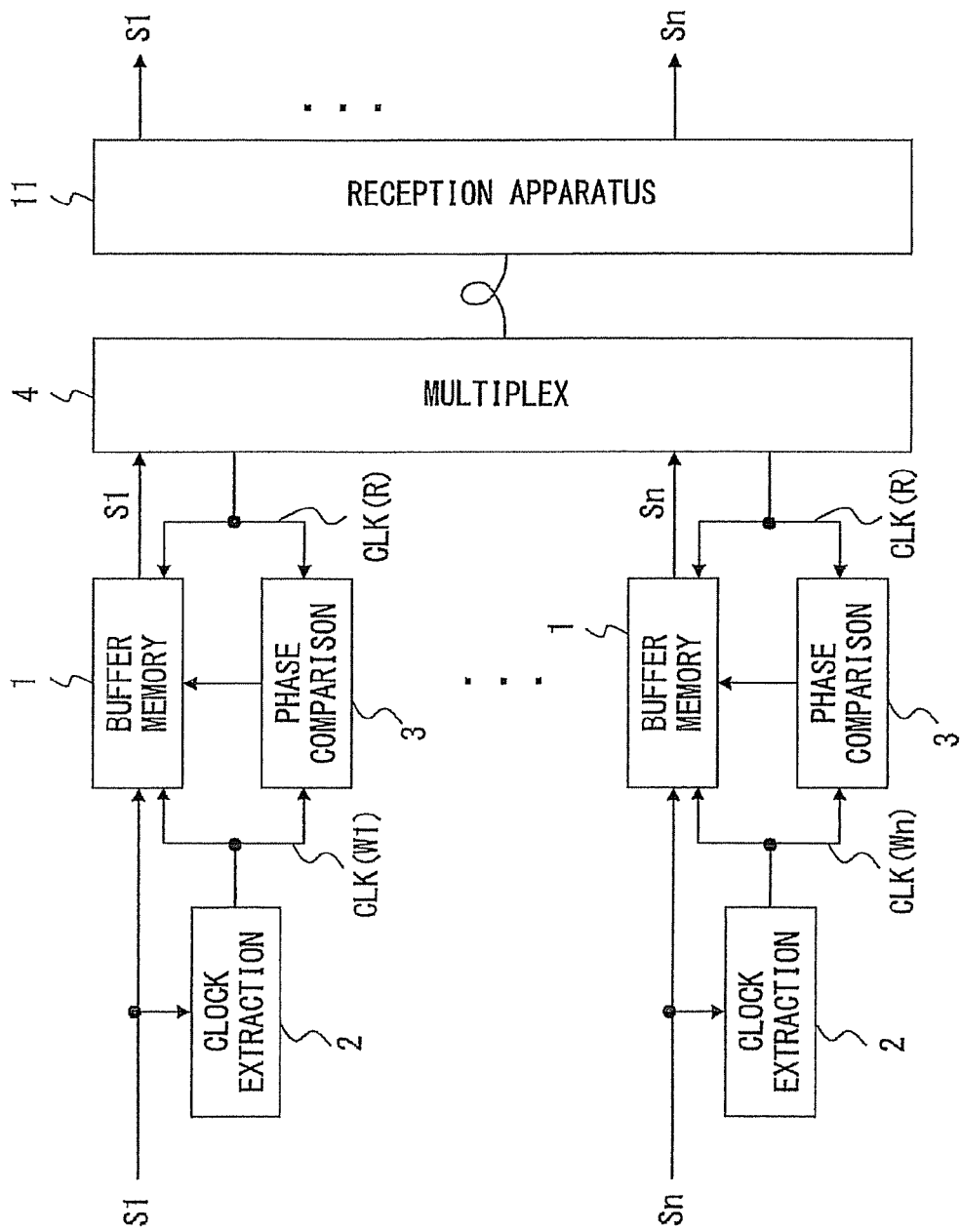
F I G. 1

F I G. 6

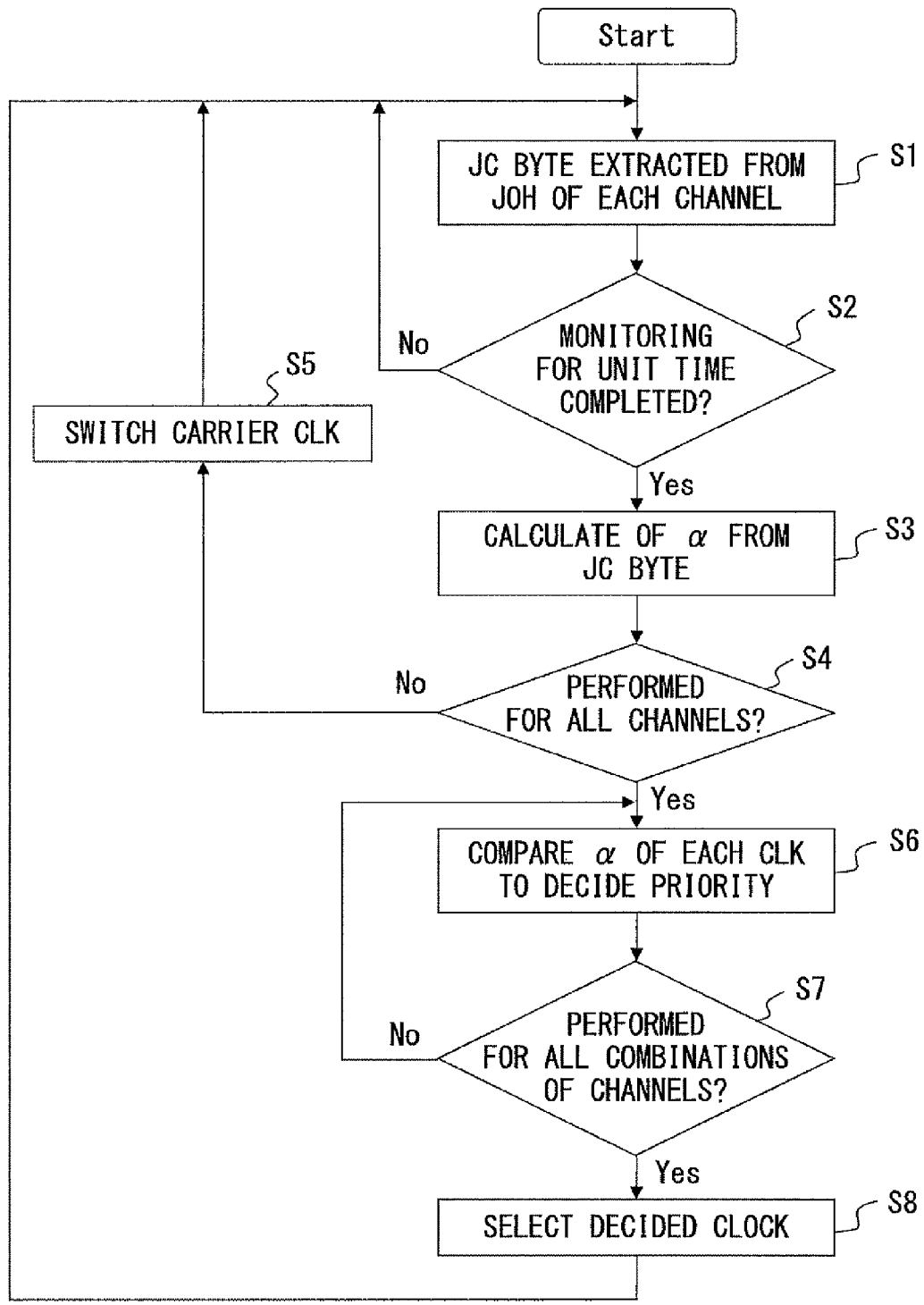
F I G. 9

| LOW-ORDER GROUP SIGNAL | CLOCK SIGNAL SELECTED AS CARRIER CLOCK (READING-OUT CLOCK) | | | | |
|---|---|---|---|---|---|
| | CLK(W1) | CLK(W2) | CLK(W3) | ... | CLK(Wn) |
| S1 | -0.5 | -0.1 | -0.4 | | -0.6 |
| S2 | -0.9 | -0.5 | -0.8 | | -1.0 |
| S3 | -0.6 | -0.2 | -0.5 | | -0.7 |
| ... | | | | | |
| Sn | -0.4 | 0 | -0.1 | | -0.5 |

FIG. 10

JITTER CONTROL APPARATUS

CROSS-REFERENCE TO RELATED APPLICATION

This application is a continuation of PCT application PCT/JP2007/000618, which was filed on Jun. 8, 2007, the entire contents of which are incorporated herein by reference.

FIELD

The present application relates to a multiplexing apparatus multiplexing a plurality of asynchronous signals and a jitter control apparatus used in the multiplexing apparatus.

BACKGROUND

The signal transmission speed in optical transmission systems has been increasing year after year. In recent years, as a next-generation backbone network, the development and practical application of 40 Gbps optical transmission system have been carried on. However, the establishment of a new network other than an existing one requires a large amount of time and costs. Therefore, a configuration to connect an existing transmission system to a new high-speed system has been put into practice. In this case, a technique is required for multiplexing low-order group signals (signal with a low transmission rate) to generate a high-order group signal (signal with a high transmission rate). Meanwhile, the system for mapping a low-order group signal into a high-order group signal and the frame structure with each transmission rate are described in, for example, the ITU-T standard (G. 709).

FIG. 1 is a diagram illustrating an example of a system for multiplexing and transmitting a plurality of low-order group signals. Here, low-order group signals S1-Sn are supposed to be asynchronous to each other.

A multiplexing apparatus has plurality of buffer memories 1 for temporarily holding respective low-order group signals. A clock extraction circuit 2 extracts (or recovers) a clock signal from a corresponding low-order group signal. In FIG. 1, clocks CLK (W1)-CLK (Wn) are extracted from the low-order group signals S1-Sn, respectively. The extracted clocks CLK (W1)-CLK (Wn) are used as writing-in clocks for the buffer memories 1. In other words, data carried by the low-order group signals S1-Sn are written into corresponding buffer memories 1 using the clocks CLK (W1)-CLK (Wn), respectively.

Data held in respective buffer memories 1 are read out in synchronization with reading-out clocks CLK (R). The reading-out clock CLK (R) is synchronized with a clock used for the multiplexing process in a multiplexer 4. The multiplexer generates and transmits a high-order group signal by multiplexing the signals S1-Sn that carry corresponding data read out from respective buffer memories 1.

A phase comparison circuit 3 detects the phase error between a corresponding writing-in clock and the reading-out clock, and performs a stuffing process when the phase error deviates from a predetermined range. In the stuffing process, a redundant bit called a stuffing bit is inserted. At this time, stuffing information indicating that a stuffing bit has been inserted is written into a predetermined position in a corresponding low-order group signal frame.

The high-order group signal generated as described above is transmitted via a network. A reception apparatus 11 obtains the low-order group signals S1-Sn by demultiplexing the high-order group signal. At this time, upon detecting the stuffing information, the reception signal 11 removes the stuffing bit from a corresponding low-order group signal. The process of removing the stiffing bit in the reception apparatus is sometimes called destuffing.

The multiplex transmission system configured as explained above is described, for example, in Japanese Laid-open Patent Application No. 1-180142.

Meanwhile, in the multiplex transmission system configured as described above, a jitter is generated with the destuffing. The amount of the jitter depends on the frequency difference between the writing-in clock and the reading-out clock. However, generally, it is difficult to match the frequencies of clock signals that are generated independently from each other. In other words, usually, the frequencies of writing-in clocks CLK (W1)-CLK (Wn) do not perfectly match each other. For this reason, jitters generated with the low-order group signals S1-Sn are not the same as each other. Then, it has been difficult to appropriately or dynamically suppress such jitters.

SUMMARY

According to an aspect of the invention, a jitter control apparatus used in a multiplexing apparatus multiplexing a plurality of signals by asynchronous mapping, includes: a detection unit configured to detect a frequency of timing compensation processes in the asynchronous mapping for each of the plurality of signals; and a selection unit configured to select, on basis of a detection result by the detection unit, a clock signal to be used as a carrier clock for the plurality of signals, from a plurality of clock signals including clock signals extracted from at least one of the plurality of signals.

According to another aspect of the invention, a multiplexing apparatus multiplexing a plurality of signals by asynchronous mapping, includes: buffer memories, respectively provided for the plurality of signals, configured to store data carried by the plurality of signals; a timing compensation unit configured to perform a timing compensation process when a phase error between a writing-in clock extracted from a corresponding signal of the plurality of signals and a reading-out clock for each buffer memory deviates from a predetermined range; a detection unit configured to detect a frequency of the timing compensation process for each of the plurality of signals; a selection unit configured to select, on basis of a detection result by the detection unit, a clock signal to be used as the reading-out clock, from a plurality of clock signals including clock signals extracted from at least one of the plurality of signals; and a multiplexer configured to multiplex signals carrying data read out from the buffer memories using the reading-out clock.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a system for multiplexing and transmitting a plurality of low-order group signals.

FIG. 6 is a diagram illustrating the configuration of the header of a frame described in G. 709.

FIG. 9 is a flowchart of the jitter control method according to the first embodiment.

FIG. 10 is an example of α value information.

DESCRIPTION OF EMBODIMENTS

Figure 2:
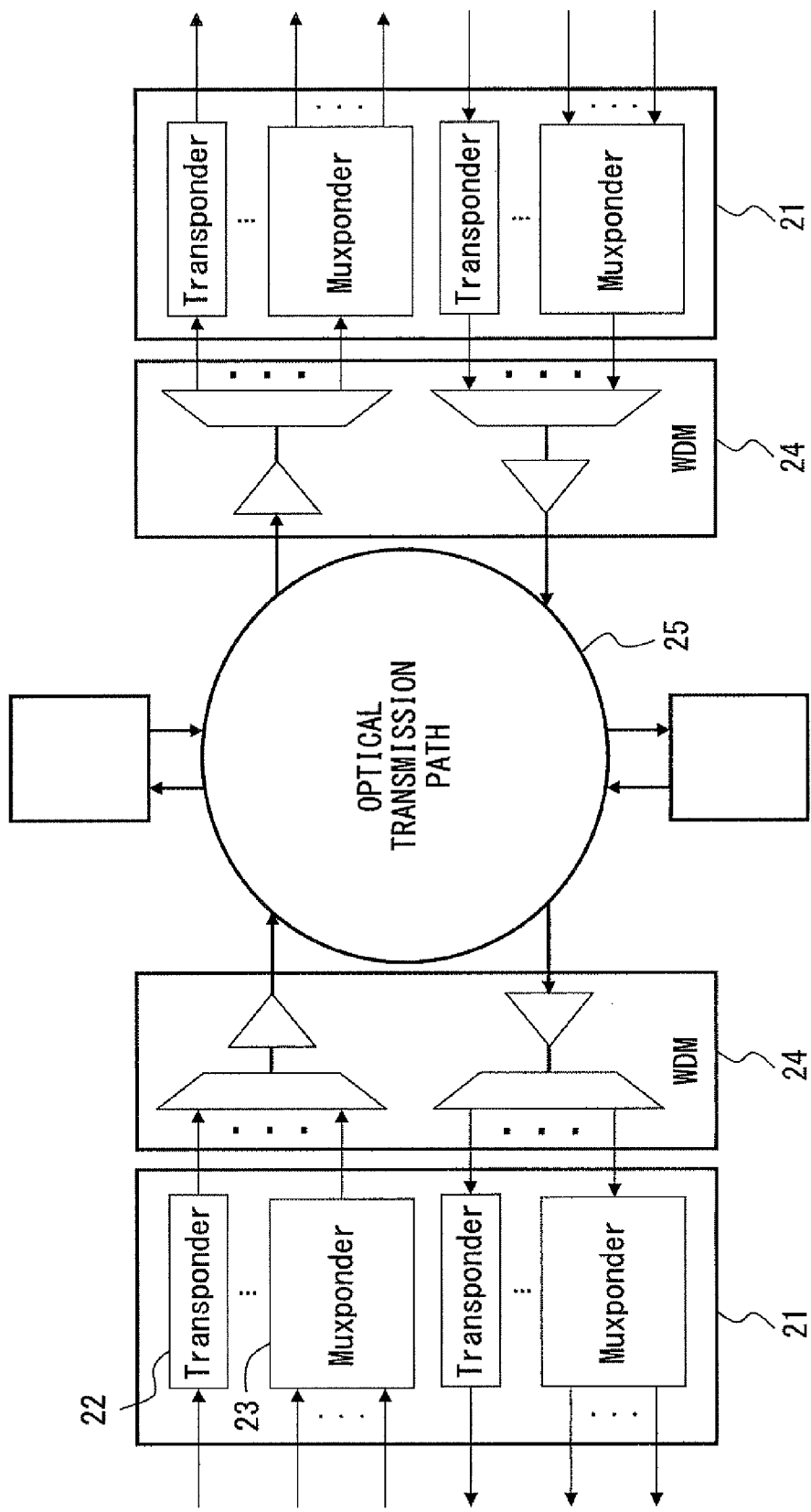
FIG. 2 is a diagram illustrating an example of an optical transmission system according to embodiments.

FIG. 2 is a diagram illustrating an example of the optical transmission system according to the embodiments. In FIG. 2, an optical interface unit 21 has one or a plurality of transponder 22 and one or a plurality of Muxponder 23, and transmits and receives an optical signal to/from a terminal apparatus that is not illustrated in the drawing. The transponder 22 terminates one optical signal, and the Muxponder 23 terminates a plurality of optical signals. Meanwhile, the Muxponder 23 has the optical TDM function (a function to multiplex a plurality of optical signals and a function to demultiplex a multiplexed optical signal into a plurality of optical signals). The wavelengths of optical signals output from the transponder 22 and the Muxponder 23 to a Wavelength Division Multiplexing (WDM) unit 24 are different from each other. In addition, the transponder 22 and the Muxponder 23 may also have a function to convert the wavelength of optical signal. Furthermore, the transponder 22 and the Muxponder 23 have a function to generate an optical pulse having a very narrow optical spectrum width (narrow-band signal), in order to realize a long-distance transmission.

The WDM unit 24 generates a WDM optical signal by multiplexing optical signals output from the transponder 22 and the Muxponder 23 and transmits the WDM optical signal to an optical transmission path 25. In addition, the WDM unit 24 separates a WDM optical signal received from the optical transmission path 25 with respect to wavelength. Meanwhile, an error correction code may be attached to the optical signal transmitted via the optical transmission path 25.

In the optical transmission system configured as described above, the multiplexing apparatus according to the embodiments may correspond to the Muxponder 23.

Figure 3:
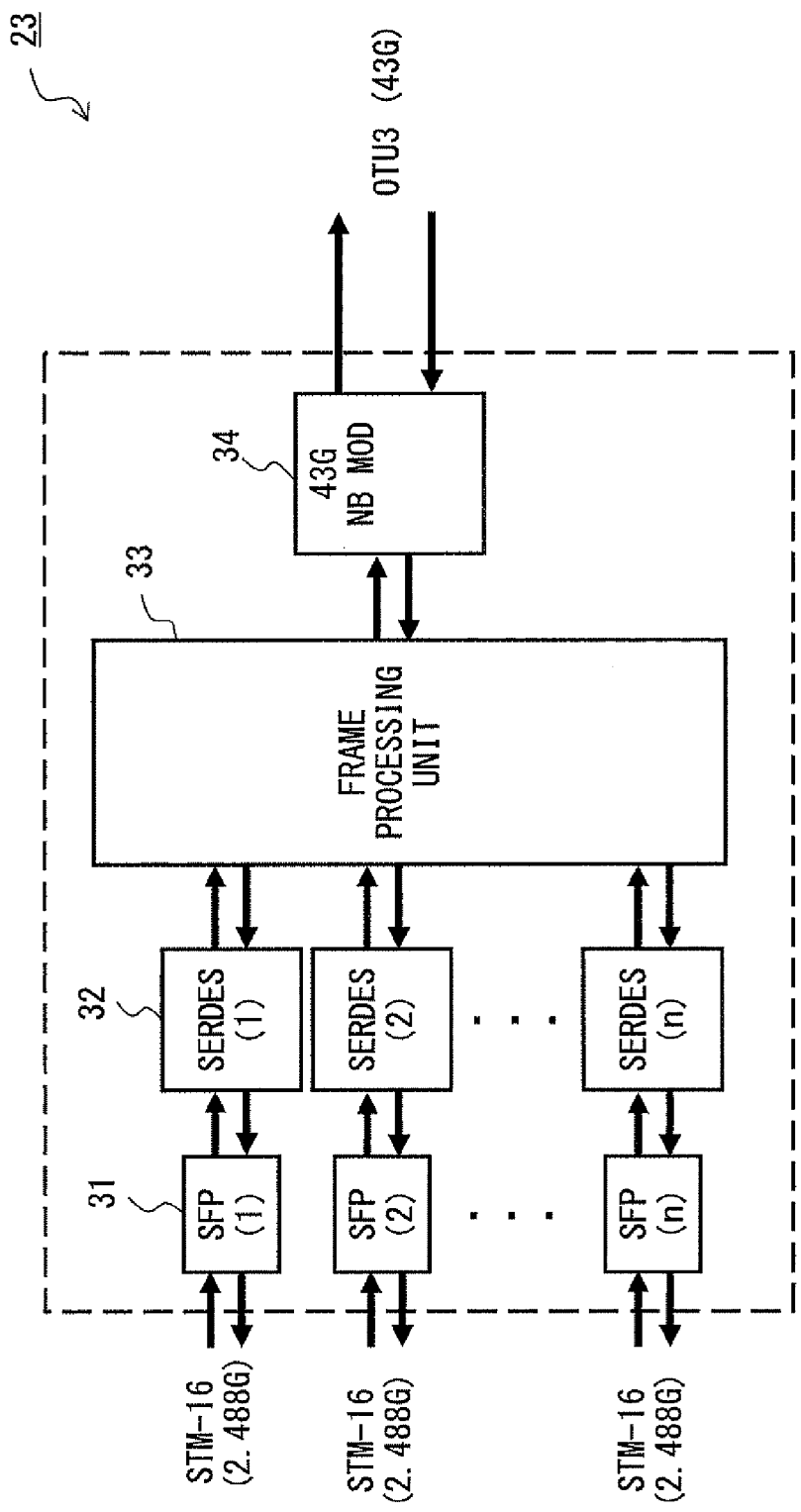
FIG. 3 is a diagram illustrating the configuration of a Muxponder.

FIG. 3 is a diagram illustrating the configuration of the Muxponder 23 as a multiplexing apparatus. The Muxponder 23 generates a high-order group signal by multiplexing a plurality of low-order group signals, and obtains low-order group signals by demultiplexing a high-order group signal. In this embodiment, the low-order group signal is a 2.4 Gbps STM-16 signal. In addition, the high-order group signal is an OTU3 signal, which is obtained by multiplexing n (here, n=16) low-order group signals. In this embodiment, the bit rate of the high-order group signal is 43 Gbps.

An SFP (Small Form factor Pluggable) 31 converts an input optical signal into an electric signal, and converts an electric signal received from an SERDES (SERialezer/DE-Serialilzer) 32 into an optical signal. Meanwhile, the SFP 31 has 2R (Regeneration, Reshape) function. The SERDES 32 converts a serial signal received from the SFP 31 into a parallel signal, and converts a parallel signal received from a frame processing unit 33 into a serial signal. In other words, the SERDES 32 performs the serial/parallel conversion. In addition, the SERDES 32 has a Retiming function. The frame processing unit 33 provides a frame multiplexing/demultiplexing function, error correction function and so on. The multiplexing/demultiplexing function of the frame processing unit 33 is to be described later. An optical module (NB-MOD: Narrow Band Module) 34 converts a signal received from the frame processing unit 33 into an optical signal, and converts an optical signal received from the optical transmission path into an electric signal.

Figure 4:
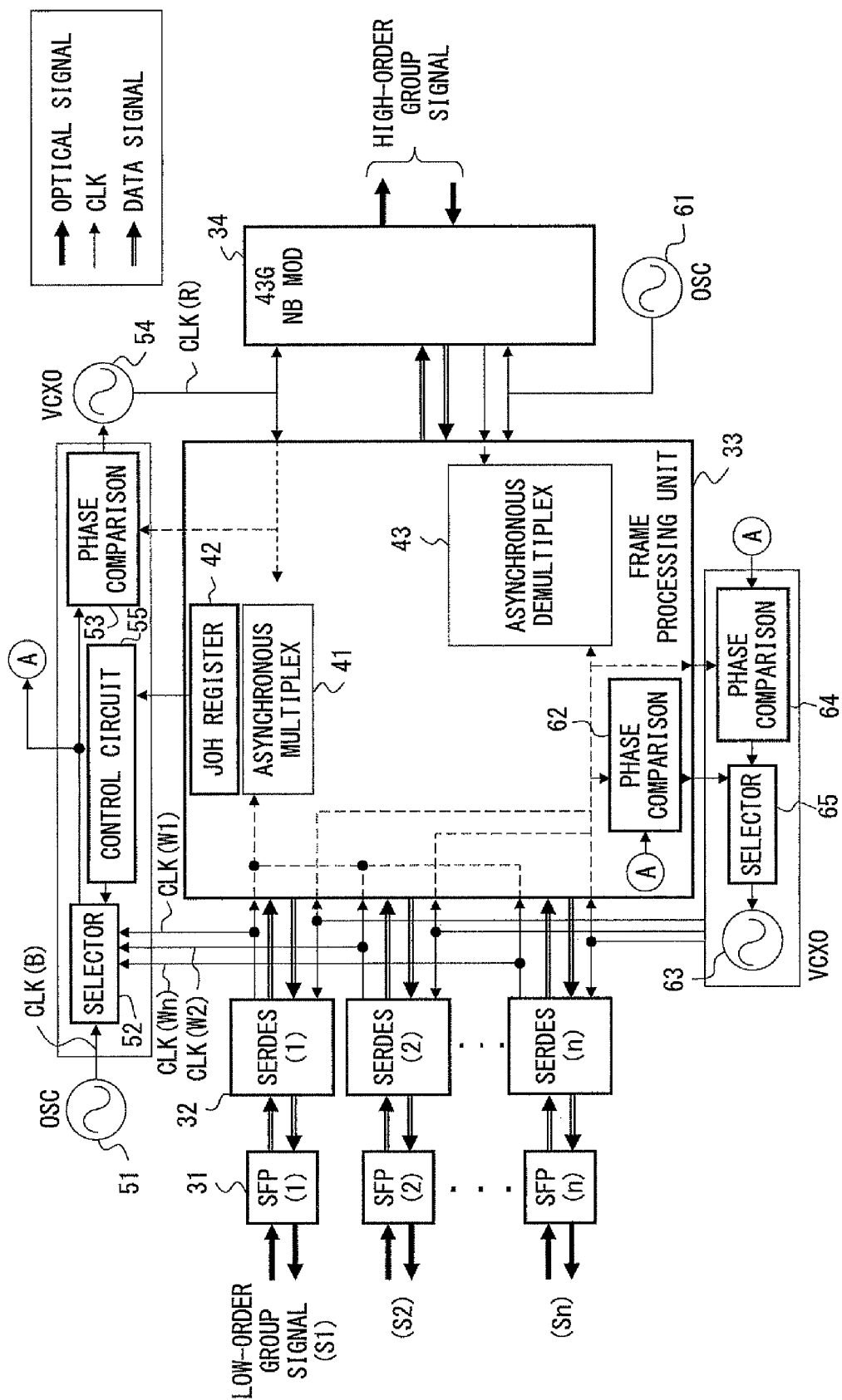
FIG. 4 is a diagram describing the multiplexing/demultiplexing operations according to embodiments.

FIG. 4 is a diagram describing the multiplexing/demultiplexing operations according to the embodiments. Meanwhile, the multiplexing/demultiplexing operations are mainly performed by the frame processing unit 33 mentioned above.

The frame processing unit 33 has an asynchronous multiplexing unit 41 that multiplexes a plurality of low-order group signals by the asynchronous mapping method (or the stuffing-synchronization multiplexing method), and an asynchronous demultiplexing unit 43 that demultiplexes a high-order group signal.

The configuration and operation of the asynchronous multiplexing unit 41 are basically as described with reference to FIG. 1. In the configuration illustrated in FIG. 4, the clock extraction circuit 2 that extracts (or recovers) a clock signal from a low-order group signal is provided in the SERDES 32. The clock signal extracted in the SERDES 32 is given to the frame processing unit 33.

Data carried by the respective low-order group signals are, as illustrated in FIG. 1, respectively written into the corresponding buffer memories 1. At this time, the data carried by the respective low-order group signals are written into the buffer memories 1 in accordance with corresponding writing-in clocks. Meanwhile, when data are read out from each buffer memory 1, a reading-out clock CLK (R) is used. In the example illustrated in FIG. 4, the reading-out clock CLK (R) is generated by a transmission PLL circuit that is to be described later.

An oscillator 51 generates a clock CLK (B). Clocks CLK (W1)-CLK (Wn) extracted from a plurality of low-order signals and the clock CLK (B) generated by the oscillator 51 are given to a selector 52. The selector 52 selects one of the clocks CLK (W1)-CLK (Wn) in accordance with an instruction from a control circuit 55 during the normal operation. On the other hand, the selector 52 selects the clock CLK (B) during an anomalous operation (for example, when an alarm signal is transmitted).

The selector 52, a phase comparator 53 and a voltage control oscillator (VCXO) 54 constitute a transmission PLL circuit. The phase comparator 53 compares the phase of a clock signal selected by the selector 52 and the phase of a clock CLK (R) generated by the voltage control oscillator 54, and gives an error signal that represents the error between the clocks to the voltage control oscillator 54. The voltage control oscillator 54 generates, for example, a clock CLK (R) for which the error signal is zero. By so doing, the frequency of the clock signal CLK (R) matches the frequency of the lock signal selected by the selector 52. Then, the clock CLK (R) is given to the asynchronous multiplexing unit 41 as a reading-out clock for reading out a low-order group signal from each buffer memory 1. Meanwhile, the clock CLK (R) is used also for multiplexing signals read out from respective buffer memories 1.

In the asynchronous mapping, the phase of the writing-in clock and the phase of the reading-out clock are compared for each low-order group signal using the phase comparison circuit 3 illustrated in FIG. 1. Then, when the phase error deviates from a predetermined range (or when the phase error exceeds a predetermined amount), a justification process (stuffing process) is performed.

Figure 5:
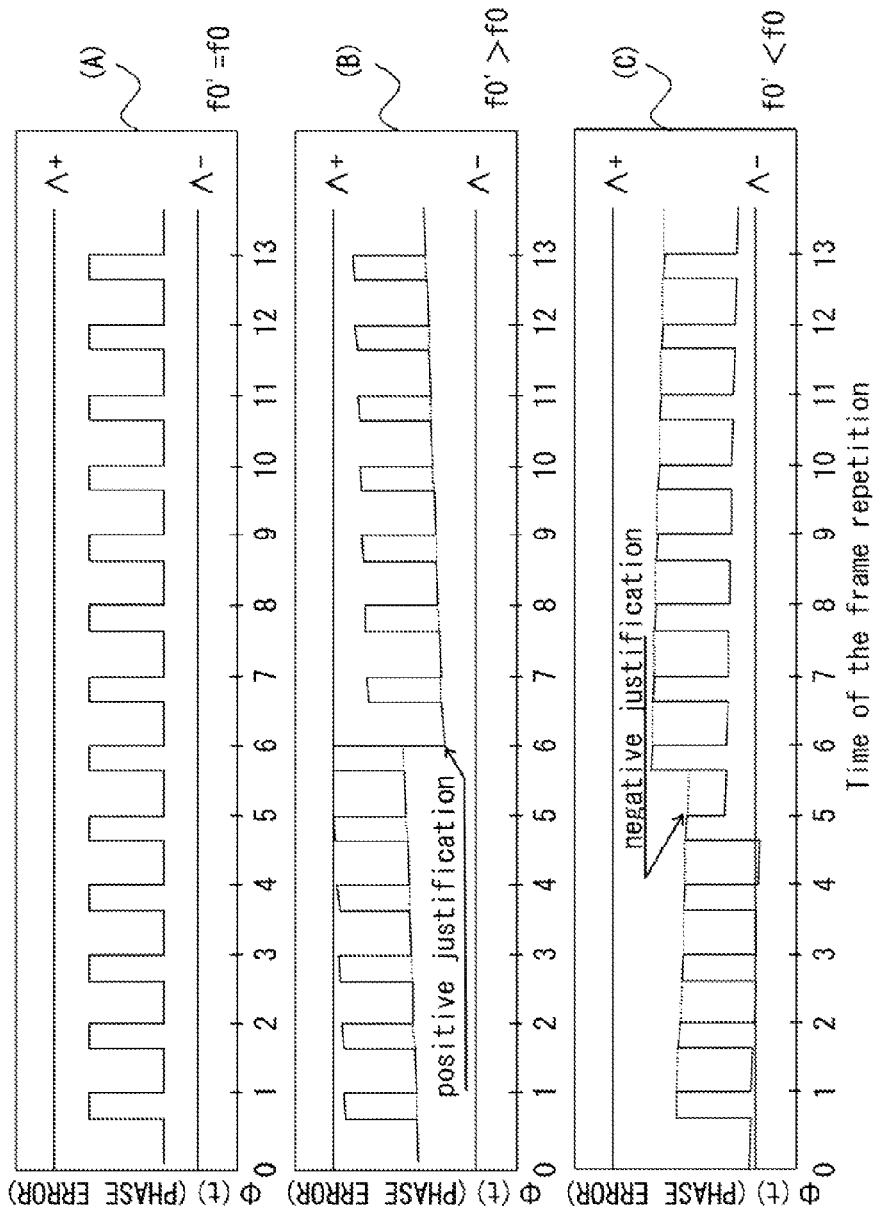
FIG. 5 is a diagram describing a justification process.

FIG. 5 is a diagram describing the justification process. Assuming that the frequency of the writing-in clock and the frequency of the reading-out clock of the buffer memory 1 as the same, as illustrated in the time chart (A) in FIG. 5, the phase error $\Phi$ between the clocks always falls within the threshold range $\Lambda(+)$–$\Lambda(-)$). In this case, there is no need to perform the stuffing process.

However, when the frequency of the reading-out clock is higher than the frequency of the writing-in clock, the phase error $\Phi$ becomes larger gradually as illustrated in the time chart (B) in FIG. 5, and exceeds the threshold value $\Lambda(+)$. In this case, in order to compensate for the timing of the asynchronous mapping, "positive justification" is performed. On the other hand, when the frequency of the reading-out clock is lower than the frequency of the writing-in clock, the phase error $\Phi$ becomes larger gradually as illustrated in the timing chart (C) in FIG. 5, and exceeds the threshold value $\Lambda(-)$. In this case, "negative justification" is performed.

As described, in the asynchronous mapping, the "justification" is performed to compensate for the phase error for each low-order group signal. The frequency (or the cycle) of the "justification" performed for each low-order group signal depends on the difference between the frequency of the writing-in clock and the frequency of the reading-out clock of the buffer memory 1. In other words, the frequency of the "justification" performed for, for example, a low-order signal S1 is proportional to the difference between the frequency of the writing-in clock CLK (W1) and the frequency of the reading-out clock CLK (R). In another words, the frequency of the "justification" performed for a low-order group signal Sn is proportional to the difference between the frequency of the writing-in clock CLK (Wn) and the reading-out clock CLK (R).

When the "justification" is performed, the notification of the fact needs to be sent to the reception apparatus. At this time, the information related to the "justification" is written into the header of a corresponding low-order group signal frame.

Figure 6:
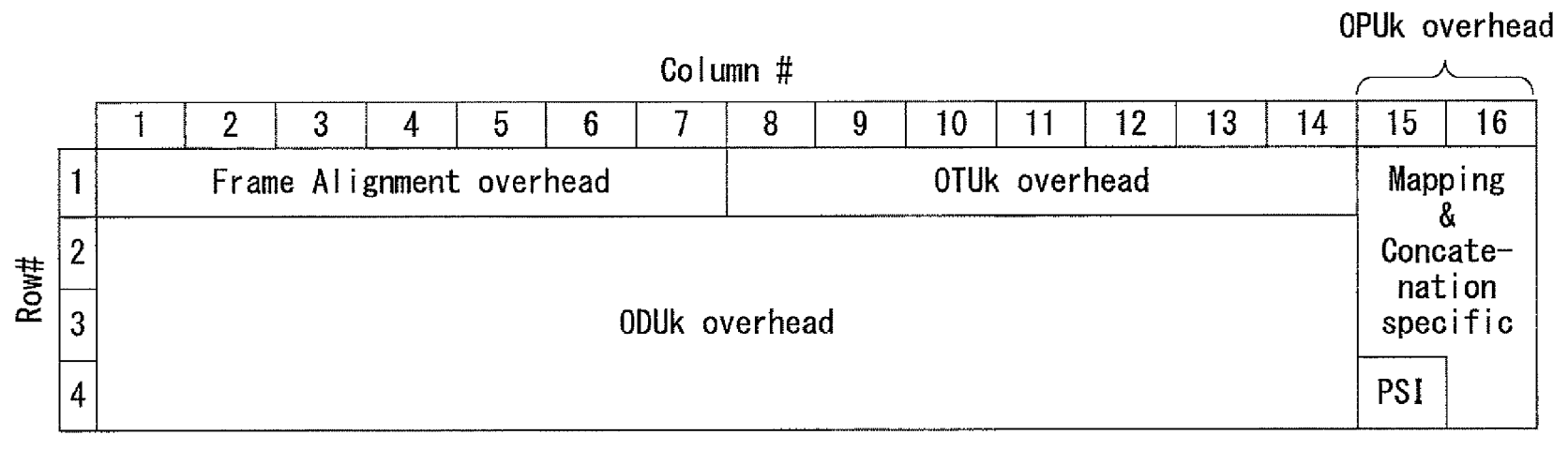

FIG. 6 is a diagram illustrating the configuration of the header of a frame described in G. 709. A Frame Alignment overhead, an Optical channel Transport Unit-k (OTUk) overhead, and an Optical channel Data Unit-k (ODUk) overhead are provided in the first-fourteenth bytes of the header. Explanation for these overheads is omitted since they are not directly relevant to the present embodiments. An Optical channel Payload Unit-k (OPUk) overhead is provided in the fifteenth-sixteenth bytes. The OPUk overhead includes Mapping and Concatenation Specific and Payload Structure Identifier (PSI).

Figure 7:
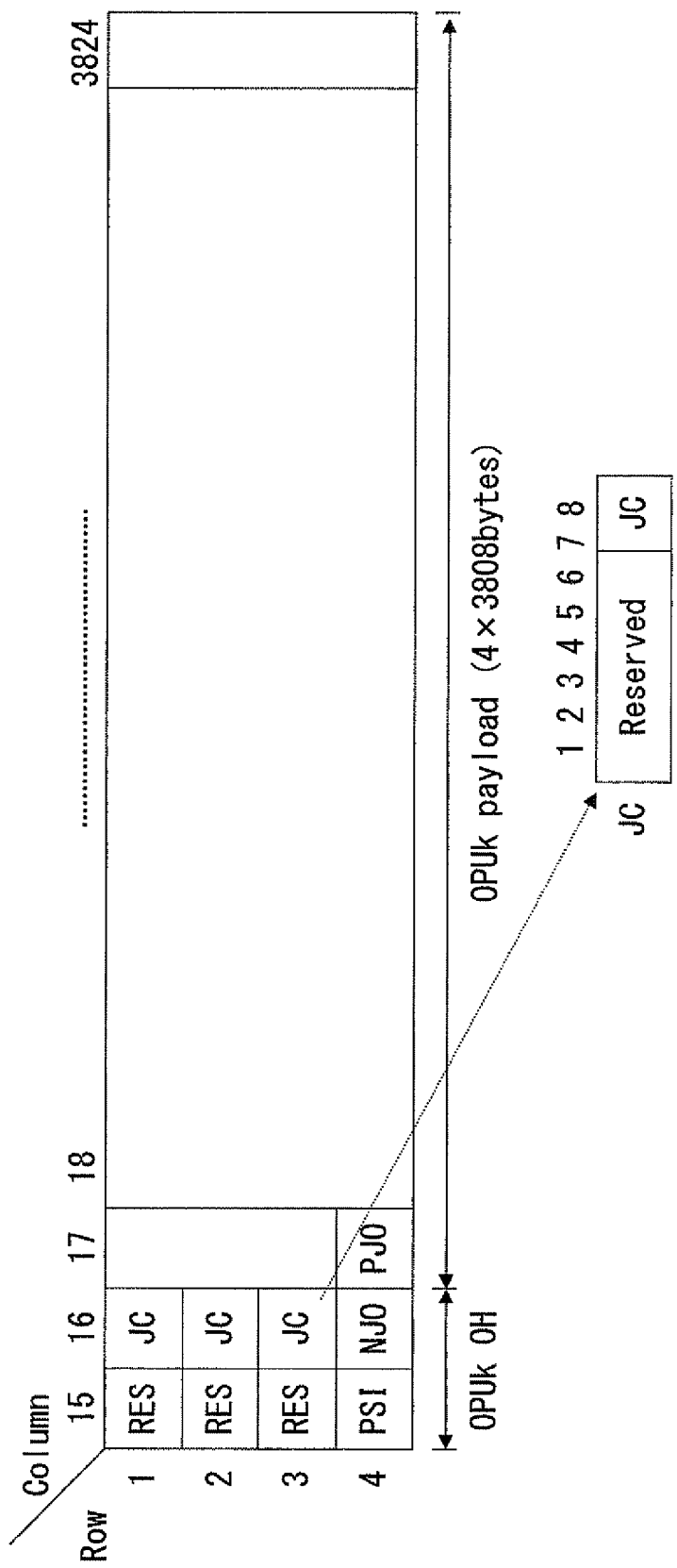
FIG. 7 is a diagram illustrating the configuration of OPUk overhead.

FIG. 7 is a diagram illustrating the configuration of the OPUk overhead. The first-third ROWs in the fifteenth byte are "reserved". The fourth ROW of the fifteenth byte is PSI. The first-third ROWs of the sixteenth byte are JC areas. That is to say, there are three Justification Control (JC) areas. The fourth ROW of the sixteenth byte is Negative Justification Opportunity (NJO). The sixteenth byte (JC and NJO) is sometimes called JOH (Justification OverHead). Meanwhile, explanation for PSI and NJO is omitted as they are not directly relevant to the present embodiments.

The information related to the "justification" (hereinafter, JC information) is written into each JC area. The JC information represents "00: no justification", "01: negative justification", and "11: positive justification". Then, the same value is written into the three JC areas. Meanwhile, the reception apparatus recognizes the JP information by a majority voting process.

FIG. 4 is referred to again. Each low-order group signal is written into the corresponding buffer memory 1 respectively. At this time, the JOH is extracted from each frame of each low-order group signal and written into a JOH register 42. Meanwhile, the phase comparison circuit 3 illustrated in FIG. 1 determines whether or not there is a need to perform the "justification", by comparing the phase of the writing-in clock and the phase of the reading-out clock. Then, the result of the determination is written into the JC area of the JOH held by the JOH register 42.

Meanwhile, the low-order group signals read out from the respective buffer memories 1 are multiplexed in the multiplexer 4 illustrated in FIG. 1. Then, a high-order group signal obtained by multiplexing the plurality of low-order group signals is transmitted via the optical transmission path.

The high-order group signal received via the optical transmission path is converted into an electric signal by the optical module (NBMOD) 34 and then sent to the asynchronous demultiplexing unit 43 in the frame processing unit 33. Here, the reception synchronization between the optical module 34 and the frame processing unit 33 is established by a clock signal generated by an oscillator 61.

The asynchronous demultiplexing unit 43 obtains a plurality of low-order group signals by demultiplexing a high-order group signal. At this time, the asynchronous demultiplexing unit 43 refers to the JC information for each frame of the respective low-order group signal. Then, when the "justification" has been performed in the transmission apparatus, a corresponding destuffing process is performed. In other words, in the case of "JC=01", the destuffing process corresponding to the "negative justification" is performed, and in the case of "JC=11", the destuffing process corresponding to the "positive justification" is performed. Meanwhile, the asynchronous demultiplexing process may be realized by a known technique.

A phase comparator 62 and a voltage control oscillator (VCXO) 63 constitute a reception PLL circuit. That is, the phase comparator 62 generates an error signal representing the phase error between the phase of a clock signal selected by the selector 52 and a clock signal generated by the voltage control oscillator 63. Then, the voltage control oscillator 63 generates a clock signal, for example, so that the phase error becomes zero. The clock signal is given to each of the SERDES 32 and the asynchronous demultiplexing unit 43. Meanwhile, during an anomalous operation (for example, when an alarm signal is transmitted as mentioned above), an error signal generated by a phase comparator 64 is selected by a selector 65 and given to the voltage control oscillator 63. In addition, the phase comparator 62, the voltage control oscillator 63, the phase comparator 64, and the selector 65 may be provided for each low-order group signal.

Meanwhile, in the multiplexing transmission system configured as described above, a jitter is generated with respect to the destuffing. The amount of jitter depends on the frequency difference between the writing-in clock and reading-out clock of the buffer memory 1.

Figure 8:
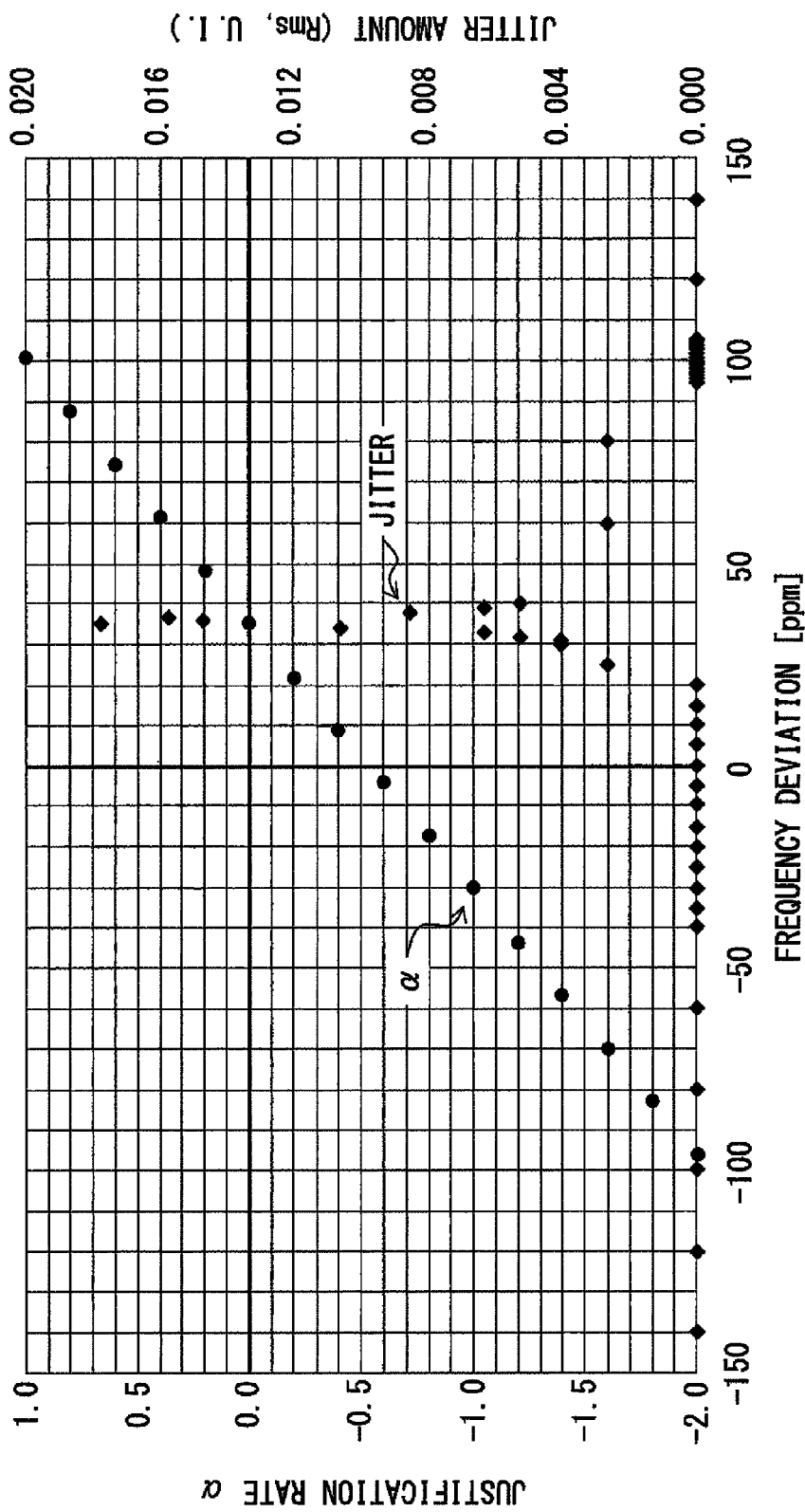
FIG. 8 is a diagram illustrating the relation between the frequency deviation and the justification rate, and the relation between the frequency deviation and the jitter.

FIG. 8 is a diagram illustrating the relation between the frequency deviation and the justification rate, and the relation between the frequency deviation and the jitter. FIG. 8 illustrates the case in which asynchronous mapping is performed between an Optical channel Data Unit (ODU) (10 Gbps signal) and an ODU3 (40 Gbps signal) are illustrated. The frequency deviation represents the proportion of the frequency difference between the frequency of the reading-out clock and the frequency of the writing-in clock to the frequency of the reading-out clock of the buffer memory 1. In addition, the justification rate α represents the number of the "justification" performed for one frame. Meanwhile, when the justification rate α is a positive value, it indicates that the "negative justification" has been performed, and when the justification rate α is a negative value, it indicates that the "positive justification" has been performed.

The justification rate α is, as illustrated in FIG. 8, proportional to the frequency deviation. In the ODU2/ODU3 mapping, in order to compensate for the difference between the structures of the ODU2 frame and the ODU3 frame, "35-ppm gap" is provided in this embodiment. Therefore, in this embodiment, "α=0" when the frequency deviation is "+35 ppm".

The jitter depends on the frequency deviation. In this embodiment, the jitter becomes maximum when the frequency deviation is "+35 ppm". That is, the jitter becomes maximum with "α=0". In other words, the jitter becomes large when the frequency of the "justification" is low.

The amount of jitter may be kept small by increasing the frequency of the "justification". For example, in the embodiment illustrated in FIG. 8, the jitter may be less than "0.004" by realizing "α<−0.2 (converted into the frequency deviation, less than 25 ppm)" or "α>0.4 (converted into the frequency deviation, larger than 60 ppm)".

Thus, in the multiplex transmission system described above, the amount of jitter generated with the destuffing depends on the justification rate α. Therefore, in the multiplexing apparatus of the present embodiment, the justification rate α is detected for each low-order group signal, and the amount of jitter of each low-order group signal is estimated on the basis of the detected α value. Then, the justification rate α is adjusted so that the amount of jitter is kept smaller than a predetermined value. The justification rate α is adjusted by switching or controlling the reading-out clock of the buffer memory 1.

Hereinafter, the method of suppressing the jitter is described returning to FIG. 4.

In FIG. 4, the control circuit 55 detects the justification rate α for each low-order group signal by constantly monitoring the JOH register 42. That is, the JC information is obtained for each frame of each low-order group signal from the JOH register 42. For example, it is assumed that when the JC information for 10 frames are obtained for the low-order group signal S1, "JC=00 (no justification)" was detected 7 times, and "JC=11 (positive justification)" was detected 3 times. In this case "α=−0.3" is obtained. In another case, it is assumed that "JC=00 (no justification)" was detected 8 times, and "JC=01 (negative justification)" was detected 2 times. In this case "α=+0.2" is obtained. Meanwhile, the processes for detecting the justification rate α for a plurality of low-order group signals may be performed in parallel.

The control circuit 55 detects the justification rate a for each low-order group signal while sequentially selecting a clock signal to be used as the reading-out clock CLK (R). The selection of the clock signal is realized by giving a switching instruction from the control circuit 55 to the selector 52. That is to say, for example, when the clock CLK (W1) is selected by the selector 52, the frequency of the clock CLK (R) is controlled to be same as the frequency of selected clock CLK (W1) in the PLL loop. In another case, when the clock CLK (W2) is selected, the frequency of the clock CLK (R) is controlled to be same as the frequency of selected clock CLK (W2). Then, on the basis of the detected justification rate α, a clock signal with which the jitter of each low-order group signal is to be suppressed appropriately is decided.

FIG. 9 is a flowchart of the jitter control method according to the first embodiment. The processes in the flowchart are performed by the control circuit 55.

The processes in steps S1-S3 are performed for each clock signal selected by the selector 52. Here, the clock signal selected by the selector 52 is extracted (or recovered) from a corresponding low-order group signal. In addition, the frequency of the read-out clock (R) is controlled to be same as the selected clock. Hereinafter, the "reading-out" clock may be referred to as a "carrier clock" here.

In steps S1 and S2, the JC information of each channel is obtained during a predetermined time period. In this example, each channel is supposed to transmit one corresponding low-order group signal. In addition, the JC information of each channel is held in the JOH register 42. The JC information is as described with reference to FIG. 7. For example, when the "predetermined time period" is 10 frames, 10 sets of JC information are obtained for each channel.

In step S3, the justification rate α for each channel is calculated on the basis of the obtained JC information. An example of the calculation method of the justification rate α is as described above.

In step S4, whether or not the processes in steps S1-S3 have been performed for all the channels is checked. If the processes in steps S1-S3 have been completed for all the channels, step S6 is performed. Otherwise, step S5 is performed. In step S5, the clock signal used for the processes in step S1-S3 is switched. That is, the next channel is selected from the channels that have not been selected yet. By so doing, the clock signal used as the carrier clock is switched.

By repeatedly performing steps S1-S5, the justification rate α for each low-order group signal in the case when clock signals extracted from the respective channels are used as the carrier clock is obtained. Then, the α value information collected as described is held in a memory area as illustrated in FIG. 10. The α value illustrated in FIG. 10 is a value for explanation. In the example illustrated in FIG. 10, for example, when a clock signal (CLK (W1)) extracted from the low-order signal S1 (CH1) is selected and used as the carrier clock, "α=−0.5", "α=−0.9", "α=−0.6" . . . "α=−0.4" are obtained for the low-order group signals S1, S2, S3, . . . , Sn. When a clock signal (CLK (W2)) extracted from the low-order signal S2 (CH2) is selected and used as the carrier clock, "α=−0.1", "α=−0.5", "α=−0.2" . . . "α=0" are obtained for the low-order group signals S1, S2, S3, . . . , Sn.

In steps S6-S7, a clock signal to be selected is determined on the basis of the collected α value information. As a method for selecting a clock signal to be used from a plurality of clock signals is, while it is not a limitation, for example, the following may be performed. Here, referring to FIG. 10, it is assumed that a clock signal to be used is selected from clock signals CLK (W1)-(Wn).

(1) The clock signal containing "α=0" is excluded. For example, in the example illustrated in FIG. 10, the α value of the low-order group signal Sn is 0 when the clock signal CLK (W2) is used. Therefore, in this case, the clock signal SLK (W2) is excluded.

(2) The clock signal containing α values in a predetermined range is excluded. For example, the amount of jitter is larger than "0.004" in the example illustrated in FIG. 8, when "−0.2<α<+0.4". Then, in the example illustrated in FIG. 10, the α value of the low-order group signal Sn is "−0.1" when the clock signal CLK (W3) is used. Therefore, in this case, the clock signal SLK (W3) is excluded.

(3) An arbitrary one is selected from the remaining clock signals. As an example, a clock signal having the smallest identification number is selected. In the example illustrated in FIG. 10, the clock signal CLK (W1) is selected.

In step S8, an instruction to select a clock signal determined in steps S6-S7 is given to the selector 52. In the above example, the selector 52 selects the clock signal CLK (W1) according to the instruction. In this case, the clock signal CLK (W1) is to be used as the carrier clock.

Meanwhile, while an arbitrary clock signal is selected from the clock signals with which the jitter of each low-order group signal become smaller than a predetermined value in the example described above, the present embodiment is not limited to this procedure. That is, for example, a clock signal with which the jitter of each low-order group signal becomes minimum may be selected on the basis of the α value information. Alternatively, a clock signal to be used as the reading-out clock may be selected so that the combination of α values for the respective low-order group signals is optimized.

Thus, in the multiplexing apparatus of the embodiment, the jitter is measured substantially by detecting the justification rate α while switching the carrier clock, utilizing that the low-order group signal uniquely corresponds to the justification rate α. Then, the jitter of each low-order signal is suppressed by selecting, as the carrier clock, a clock signal with which the jitter is to be small according to the justification rate α.

Figure 11:
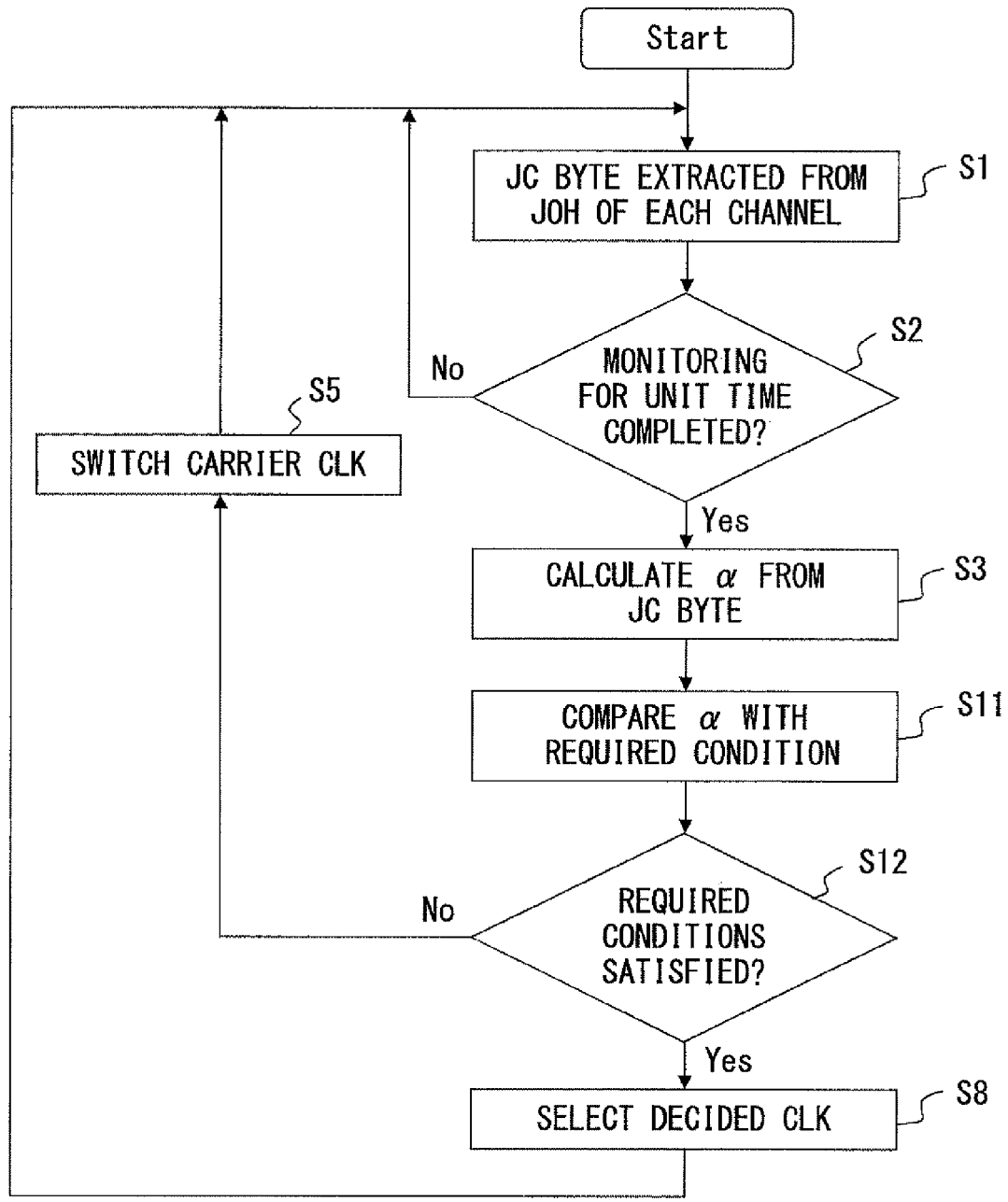
FIG. 11 is a flowchart of the jitter control method according to the second embodiment.

FIG. 11 is a flowchart of the jitter control method according to the second embodiment. In the second embodiment, when the α value information is collected for a given clock signal in steps S1-S3, the α value information and a predetermined required condition are compared in steps S11-S12. The required condition is, for example, "the α values for all the low-order group signals fall within a predetermined range". For example, in order to make the amount of jitter smaller than "0.004" in the example illustrated in FIG. 8, the required condition for the α value is "−0.2>α" or "α>+0.4". Then, when there is an α value that does not satisfy the required condition, the next clock signal is selected in step S5, and steps S1-S3 are performed.

When all the α values satisfy the required condition, step S8 is performed without the selection of the next clock. In step S8, an indication that identifies the clock signal selected at the time all the α values satisfy the required condition is given to the selector 52. Then, the selector 52 selects the indicated clock signal, and the selected clock signal is to be used as the carrier clock.

Thus, in the second embodiment, without collecting the α value information for all the clock signals, the clock signal to be used as the carrier clock is determined at the time when the clock signal that satisfies the required condition is detected. Therefore, with the procedure of the second embodiment, compared with the first embodiment, the time required for the process to suppress the jitter is shortened.

The processes in the first embodiment and the second embodiment may be performed constantly, or may be repeated periodically.

Figure 12:
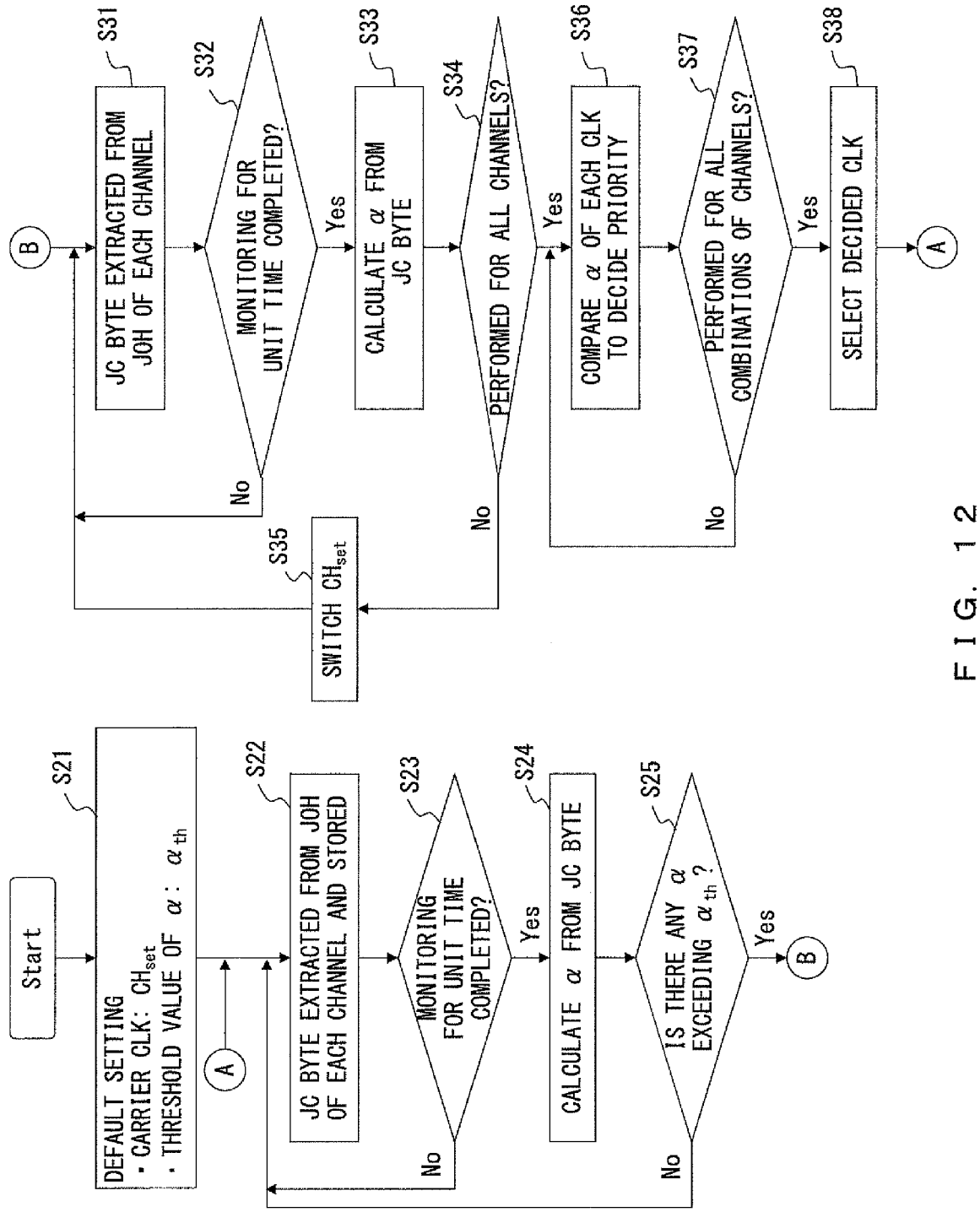
FIG. 12 is a flowchart of the jitter control method according to the third embodiment.

FIG. 12 is a flowchart of the jitter control method according to the third embodiment. In the third embodiment, first, in step S21, default setting is performed. That is, a default channel CHset (for example, CH1) is set. In addition, a threshold value αth for the justification rate α is set. Therefore, during the period in which the processes in steps S22-S25 are performed, a clock signal extracted from the default channel CHset is used as the carrier clock.

In step S22-S23, the JC information of each channel is obtained for a predetermined time period. In step S24, the justification rate α is calculated on the basis of the obtained JC information. In step S25, if there is no α value exceeding the threshold value αth, the process is return to step S22. Here, "exceeding the threshold value αth" means, for example, in order to make the amount of jitter smaller than "0.004" in the example illustrated in FIG. 8, "−0.2>α" or "α>+0.4".

If there is an α value that exceeds the threshold value αth, the processes in steps S31-S38 are performed. The processes in steps S31-S38 are basically the same as steps S1-S8 presented in FIG. 9.

Thus, in the third embodiment, a clock signal extracted from the default channel is used as the carrier clock. Then, the α value is monitored in the state in which the default clock is used, and the process (steps S31-S38) to switch the clock is performed only when the α value exceeds the threshold value. Therefore, the frequency to perform the process to switch the clock signal becomes low.

Figure 13:
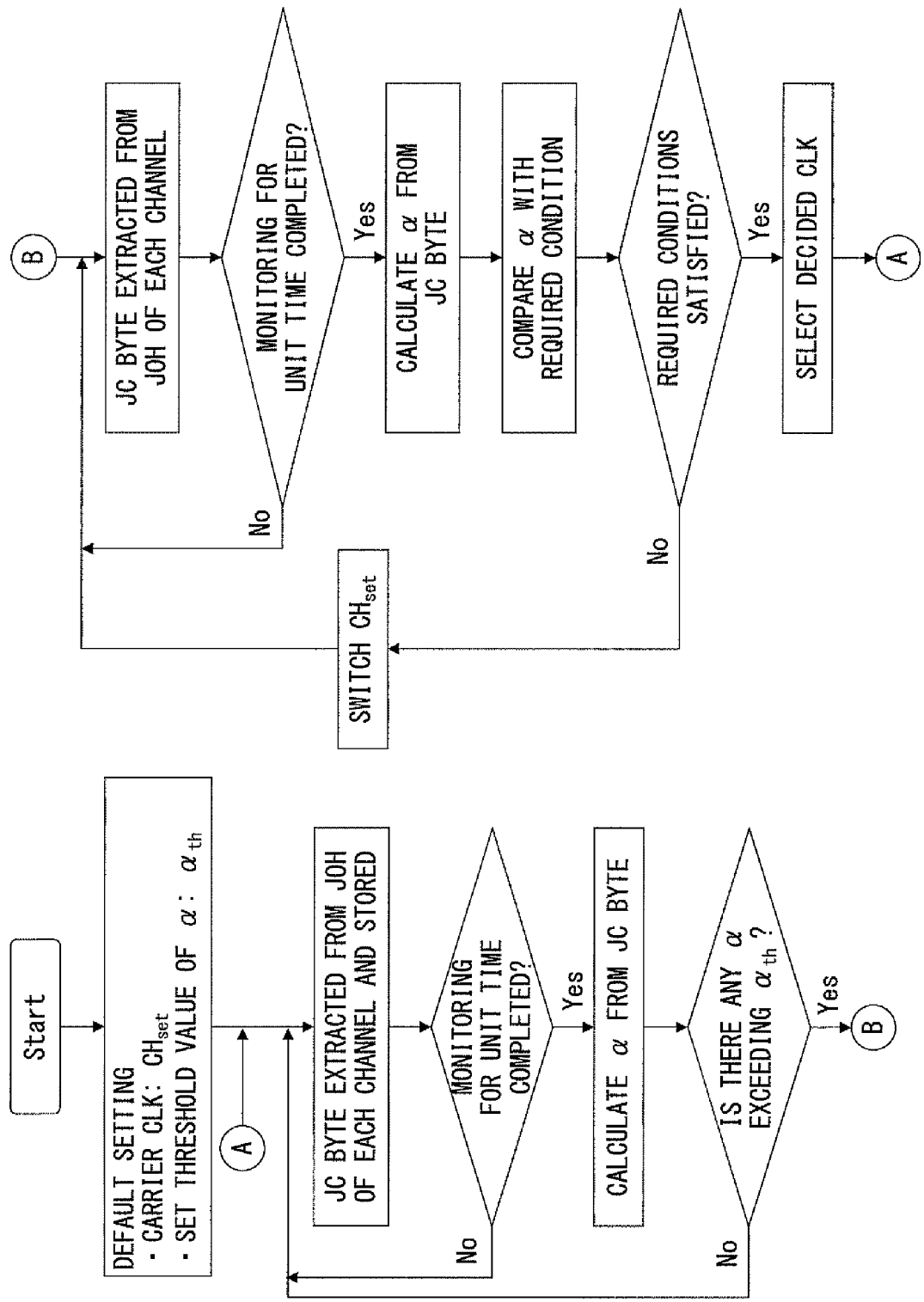
FIG. 13 is a flowchart of the jitter control method according to the fourth embodiment.

FIG. 13 is a diagram illustrating a flowchart of the jitter control method according to the fourth embodiment. The procedure of the fourth embodiment is realized by combining steps S21-S25 of the third embodiment illustrated in FIG. 12 and the processes in the second embodiment illustrated in FIG. 11.

Figure 14:
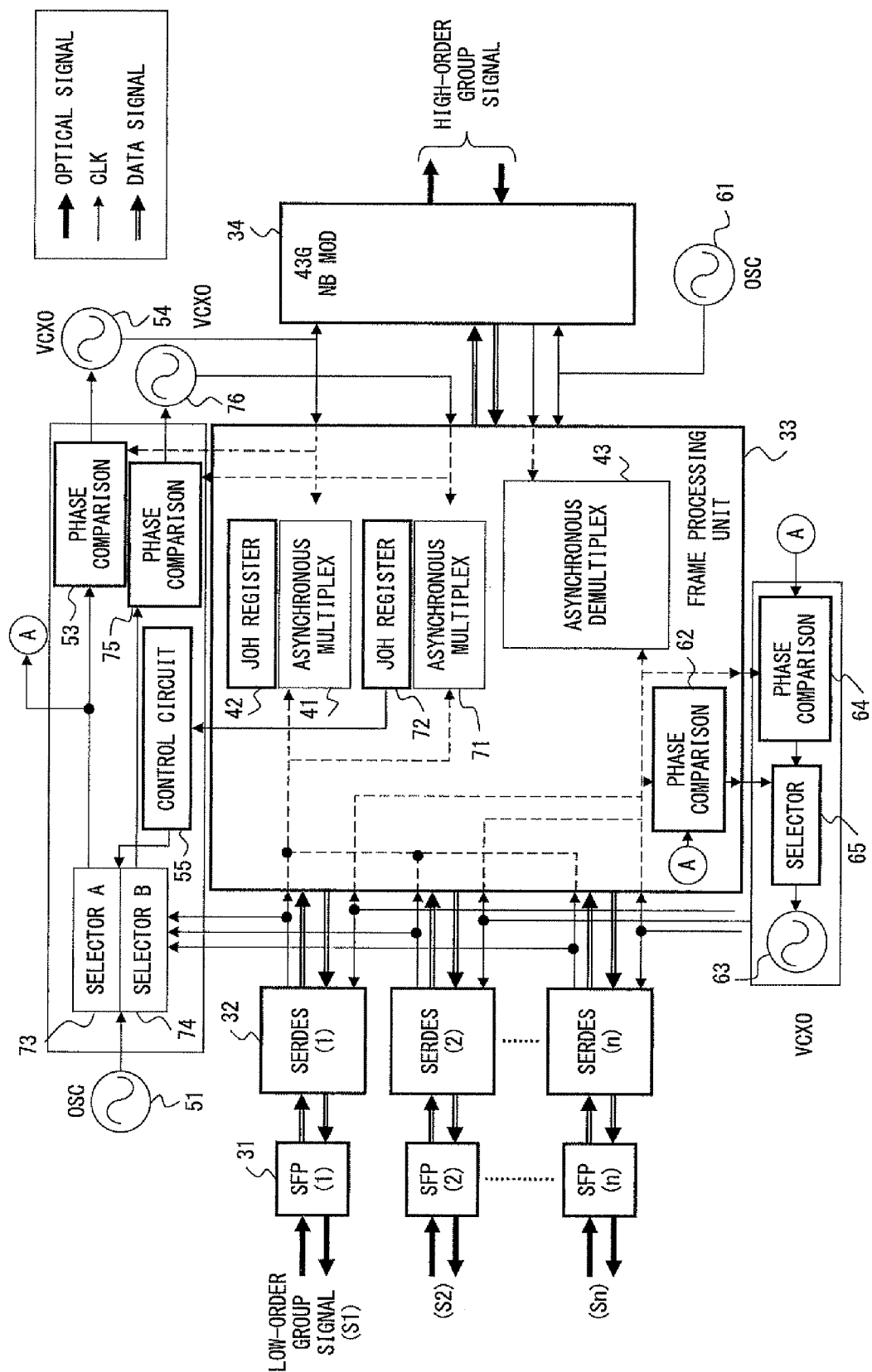
FIG. 14 is a diagram illustrating the configuration of another embodiment of the multiplexing apparatus.

FIG. 14 is a diagram illustrating the configuration of another embodiment of the multiplexing apparatus. In the multiplexing apparatus illustrated in FIG. 14, input data signal is supplied to an active-system circuit and to a reference-system circuit. Here, the asynchronous multiplexing unit 41 and the JOH register 42 operate as the active-system circuit, and an asynchronous multiplexing unit 71 and a JOH register 72 operate as the reference-system circuit. Then, the same data signal is input to the asynchronous multiplexing unit 41 and the asynchronous multiplexing unit 61.

The configurations and operations of the asynchronous multiplexing units 41, 71 are the same as each other, and they respectively extract JC information from the OPUk overhead and write it into JOH registers 42, 72. The control circuit 55 detects the justification rate α for each low-order signal by continuously monitoring the JOH register 72.

A selector 74, a phase comparator 75, and a voltage control oscillator 76 constitute a reference-system PLL circuit. The selector 74 selects a clock signal indicated by the control circuit 55 and supplies it to the phase comparator 75. According to this configuration, the oscillation frequency of the voltage control oscillator 76 is controlled so as to match the frequency of the clock signal selected by the selector 74. Thus, in the reference system, a clock signal generated by the voltage control oscillator 76 is used as the carrier clock.

The operation of the control circuit 55 is as described with reference to FIG. 4-FIG. 8. That is, the procedure to switch the clock signals to determine the clock signal to be selected, the procedure to calculate the α value corresponding to each clock signal, and the procedure to determine the clock signal to be selected on the basis of the α value information are as described above. Then, the selector 74 supplies the clock signal determined by the control circuit 55 to a selector 73.

The selector 73, the phase comparator 53, and the voltage control oscillator 54 constitute an active-system PLL circuit. During the normal operation, the selector 73 transfers a clock signal given from the selector 74 to the phase comparator 53. By this configuration, the oscillation frequency of the voltage control oscillator 54 is controlled so as to match the frequency of the clock signal determined by the control circuit 55. Then, in the active system, the clock signal generated by the voltage control oscillator 54 is used as the carrier clock. Meanwhile, during an anomalous operation (for example, when an alarm signal is transmitted), the selector 73 selects a clock signal generated by the oscillator 51.

Thus, in the multiplexing apparatus illustrated in FIG. 14, a reference system is provided in parallel with the active system. Then, a clock signal with which the jitter is suppressed is detected using the reference system, and the clock signal to be used as the carrier clock is switched in the active system in accordance with the detection result. Therefore, in the active system for actually transmitting the data signal, there is no need to switch the clock signals to detect a clock signal with which the jitter is suppressed.

The reading-out clock (that is, the carrier clock) is selected from the clock signals extracted from the respective low-order group signals in the embodiments described above, however, the present embodiment is not limited to this configuration. That is, the reading-out clock may be selected from a plurality of clock signals that include the clock signals extracted from the respective low-order group signals. In this case, for example, the reading-out clock may be selected from the clock signals extracted from the respective low-order group signals and a clock signal generated by the oscillator 51.

According to the multiplexing apparatus multiplexing a plurality of asynchronous signals of the embodiments described, jitters of respective signals are suppressed.

Additionally, in the configuration of the embodiments, when a plurality of signals are multiplexed by asynchronous mapping, the amount of jitter depends on the frequency of the executions of a timing compensation process (stuffing or justification process). For this reason, the amount of jitter can be estimated by detecting the frequency of the timing compensation process. Meanwhile, the frequency of the timing compensation process depends on the frequency of the carrier clock. In other words, the frequency of the timing compensation process (that is, the amount of jitter) for each signal can be adjusted by changing the frequency of the carrier clock. Therefore, the jitter of each signal can be suppressed by selecting a clock signal to be used as the carrier clock on the basis of the frequency of the timing compensation process detected for the respective signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A jitter control apparatus used in a multiplexing apparatus multiplexing a plurality of signals by asynchronous mapping, the jitter control apparatus comprising:
   a detection unit configured to detect a rate indicating a number of times of a timing compensation process that is performed in a specific period in the asynchronous mapping for each of the plurality of signals; and
   a selection unit configured to select, on basis of a detection result by the detection unit, a clock signal to be used as a carrier clock for the plurality of signals, from a plurality of clock signals including clock signals extracted from at least one of the plurality of signals.

2. The jitter control apparatus according to claim 1, wherein
   the detection unit constantly detects the rate indicating the number of times of the timing compensation process each of the plurality of signals; and
   the selection unit selects the clock signal to be used as the carrier clock on basis of the detection result by the detection unit.

3. The jitter control apparatus according to claim 1, wherein
   the detection unit periodically detects the rate indicating the number of times of the timing compensation process for each of the plurality of signals; and
   the selection unit selects the clock signal to be used as the carrier clock on basis of the detection result by the detection unit.

4. The jitter control apparatus according to claim 1, wherein
   the selection unit selects the clock signal to be used as the carrier clock so that a combination of rates for the plurality of signals is optimized based on a relationship between the rate indicating the number of times of the timing compensation process for one of the plurality of signals and an amount of jitter of the one of the plurality of signals, each of the rates representing the rate indicating the number of times of the timing compensation process for each of the plurality of signals.

5. The jitter control apparatus according to claim 1, wherein
   the selection unit selects the clock signal to be used as the carrier clock so that a combination of rates for the plurality of signals satisfies a predetermined condition, each of the rates representing the rate indicating the number of times of the timing compensation process for each of the plurality of signals.

6. The jitter control apparatus according to claim 1, wherein
   the selection unit sequentially selects the clock signal one by one from the plurality of clock signals;
   the detection unit detects, for each of the selected clock signals, the rate indicating the number of times of the timing compensation process for each of the plurality of signals; and
   the selection unit terminates the sequentially selecting of the clock signal at a time when a combination of detected rates satisfies a predetermined condition and outputs the clock signal that satisfies the predetermined condition.

7. The jitter control apparatus according to claim 1, wherein
   the selection unit switches the clock signal to be used as the carrier clock when rates for the plurality of signals do not satisfy a predetermined initial condition, each of the rates representing the rate indicating the number of times of the timing compensation process for each of the plurality of signals.

8. A multiplexing apparatus multiplexing a plurality of signals by asynchronous mapping, the multiplexing apparatus comprising:
   buffer memories, respectively provided for the plurality of signals, configured to store data carried by the plurality of signals;
   a timing compensation unit configured to perform a timing compensation process when a phase error between a writing-in clock extracted from a corresponding signal of the plurality of signals and a reading-out clock for each buffer memory deviates from a predetermined range;

a detection unit configured to detect a rate indicating a number of times of the timing compensation process that is performed in a specific period for each of the plurality of signals;

a selection unit configured to select, on basis of a detection result by the detection unit, a clock signal to be used as the reading-out clock, from a plurality of clock signals including clock signals extracted from at least one of the plurality of signals; and a multiplexer configured to multiplex signals carrying data read out from the buffer memories using the reading-out clock.

9. A multiplexing apparatus multiplexing a plurality of signals by asynchronous mapping, the multiplexing apparatus comprising:

first buffer memories, respectively provided for the plurality of signals, configured to store data carried by the plurality of signals;

second buffer memories, respectively provided for the plurality of signals, configured to store data carried by the plurality of signals;

a first timing compensation unit configured to perform a timing compensation process when a phase error between a writing-in clock extracted from a corresponding signal of the plurality of signals and a reading-out clock for each of the first buffer memories deviates from a predetermined range;

a second timing compensation unit configured to perform a timing compensation process when a phase error between a writing-in clock extracted from a corresponding signal of the plurality of signals and a reading-out clock for each of the second buffer memories deviates from a predetermined range;

a detection unit configured to detect a rate indicating a number of times of the timing compensation process that is performed in a specific period by the second timing compensation unit for each of the plurality of signals;

a selection unit configured to select, on basis of a detection result by the detection unit, a clock signal to be used as the reading-out clock for the first buffer memories, from a plurality of clock signals including clock signals extracted from at least one of the plurality of signals; and a multiplexer configured to multiplex signals carrying data read out from the first buffer memories using the reading-out clock.

* * * * *